(12) United States Patent
Han et al.

(10) Patent No.: US 10,031,884 B2
(45) Date of Patent: Jul. 24, 2018

(54) STORAGE APPARATUS AND METHOD FOR PROCESSING PLURALITY OF PIECES OF CLIENT DATA

(71) Applicant: Samsung Electronics Co., Ltd., Gyeonggi-do (KR)

(72) Inventors: Sung Chul Han, Gyeonggi-do (KR); Joon Won Ko, Seoul (KR); In Chul Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 212 days.

(21) Appl. No.: 15/002,008

(22) Filed: Jan. 20, 2016

(65) Prior Publication Data

US 2016/0232125 A1    Aug. 11, 2016

(30) Foreign Application Priority Data

Feb. 11, 2015  (KR) .......................... 10-2015-0021198
Mar. 12, 2015  (KR) .......................... 10-2015-0034701

(51) Int. Cl.
| | | |
|---|---|---|
| *G06F 15/167* | (2006.01) | |
| *G06F 11/07* | (2006.01) | |
| *G06F 17/30* | (2006.01) | |

(52) U.S. Cl.
CPC ........ *G06F 15/167* (2013.01); *G06F 11/0727* (2013.01); *G06F 17/30017* (2013.01); *G06F 17/30371* (2013.01)

(58) Field of Classification Search
CPC combination set(s) only.
See application file for complete search history.

(56) References Cited

U.S. PATENT DOCUMENTS

| | | | |
|---|---|---|---|
| 5,513,375 A | 4/1996 | Peters | |
| 7,194,568 B2 | 3/2007 | Jeter, Jr. et al. | |
| 8,949,483 B1* | 2/2015 | Martin .................. | G06F 3/0653 710/15 |
| 8,954,393 B1* | 2/2015 | Botes ................ | G06F 17/30221 707/635 |
| 9,026,765 B1* | 5/2015 | Marshak ................ | G06F 3/061 711/114 |
| 2010/0083059 A1* | 4/2010 | Lenart ................ | G06F 11/0766 714/57 |

(Continued)

FOREIGN PATENT DOCUMENTS

WO    WO 02/046888    6/2002

*Primary Examiner* — Ninos Donabed
(74) *Attorney, Agent, or Firm* — The Farrell Law Firm, P.C.

(57) ABSTRACT

A storage device, method for processing a plurality of pieces of client data, and a chipset are provided. The storage device includes a first stage storage unit configured to receive the plurality of pieces of client data generated in bursts from a plurality of clients and store the received plurality of pieces of client data; a second stage storage unit configured to receive the plurality of pieces of client data from the first stage storage unit and store the received plurality of pieces of client data in a plurality of memory banks shared by the plurality of clients, respectively, in bursts; and a third stage storage unit configured to receive each of the plurality of pieces of client data from the second stage storage unit and store data of a transaction unit corresponding to a transmission unit for data processing.

16 Claims, 10 Drawing Sheets

(56) References Cited

U.S. PATENT DOCUMENTS

| | | | |
|---|---|---|---|
| 2010/0321183 A1* | 12/2010 | Donovan | G08B 13/19645 340/540 |
| 2011/0055232 A1* | 3/2011 | Graefe | G06F 12/08 707/752 |
| 2011/0082866 A1* | 4/2011 | Brown | H04L 45/00 717/744 |
| 2011/0125772 A1* | 5/2011 | Ah-Soon | G06F 17/30525 707/759 |
| 2011/0246503 A1* | 10/2011 | Bender | G06F 17/30306 707/769 |
| 2011/0296078 A1 | 12/2011 | Khan et al. | |
| 2011/0302189 A1* | 12/2011 | Liu | G06F 17/30929 707/769 |
| 2012/0005419 A1* | 1/2012 | Wu | G06F 17/30946 711/105 |
| 2012/0159091 A1* | 6/2012 | Li | G06F 11/3612 711/154 |
| 2014/0351224 A1* | 11/2014 | Dickey | H04N 21/84 707/689 |
| 2014/0372471 A1* | 12/2014 | Claudel | H04L 67/12 707/769 |

* cited by examiner

| Unit GC/bit | Width | | | | | | | | | | | | | | |
|---|---|---|---|---|---|---|---|---|---|---|---|---|---|---|---|
| Depth | 4 | 8 | 16 | 24 | 32 | 40 | 48 | 56 | 64 | 72 | 80 | 96 | 112 | 128 | 144 |
| 32 | 3.84 | 2.28 | 1.50 | 1.24 | 1.11 | 1.03 | 0.98 | 0.95 | 0.92 | 0.90 | 0.88 | 0.85 | 0.83 | 0.82 | 0.81 |
| 48 | 2.86 | 1.70 | 1.12 | 0.93 | 0.83 | 0.77 | 0.73 | 0.71 | 0.69 | 0.67 | 0.66 | 0.64 | 0.62 | 0.61 | 0.60 |
| 64 | 1.92 | 1.26 | 0.93 | 0.77 | 0.69 | 0.64 | 0.61 | 0.59 | 0.57 | 0.56 | 0.55 | 0.53 | 0.52 | 0.51 | 0.50 |
| 80 | 1.64 | 1.08 | 0.80 | 0.68 | 0.61 | 0.56 | 0.53 | 0.51 | 0.50 | 0.49 | 0.48 | 0.46 | 0.45 | 0.45 | 0.44 |
| 96 | 1.46 | 0.96 | 0.71 | 0.61 | 0.55 | 0.51 | 0.48 | 0.47 | 0.45 | 0.44 | 0.43 | 0.42 | 0.41 | 0.41 | 0.40 |
| 112 | 1.33 | 0.88 | 0.65 | 0.57 | 0.51 | 0.47 | 0.45 | 0.43 | 0.42 | 0.41 | 0.40 | 0.39 | 0.38 | 0.38 | 0.37 |
| 128 | 1.23 | 0.81 | 0.60 | 0.53 | 0.48 | 0.44 | 0.42 | 0.41 | 0.39 | 0.39 | 0.38 | 0.37 | 0.36 | 0.35 | 0.35 |
| 160 | 1.10 | 0.72 | 0.53 | 0.47 | 0.44 | 0.41 | 0.39 | 0.37 | 0.36 | 0.35 | 0.34 | 0.33 | 0.33 | 0.32 | 0.32 |
| 192 | 0.99 | 0.66 | 0.49 | 0.43 | 0.40 | 0.38 | 0.36 | 0.35 | 0.34 | 0.33 | 0.32 | 0.31 | 0.31 | 0.30 | 0.30 |
| 256 | 0.83 | 0.59 | 0.43 | 0.38 | 0.36 | 0.34 | 0.33 | 0.32 | 0.31 | 0.30 | 0.29 | 0.29 | 0.28 | 0.28 | 0.27 |
| 320 | 0.74 | 0.54 | 0.40 | 0.35 | 0.33 | 0.32 | 0.31 | 0.30 | 0.29 | 0.29 | 0.28 | 0.27 | 0.27 | 0.26 | 0.26 |
| 384 | 0.67 | 0.50 | 0.38 | 0.33 | 0.31 | 0.30 | 0.29 | 0.28 | 0.28 | 0.27 | 0.27 | 0.26 | 0.26 | 0.25 | 0.25 |
| 448 | 0.63 | 0.47 | 0.36 | 0.32 | 0.30 | 0.29 | 0.28 | 0.27 | 0.27 | 0.26 | 0.26 | 0.25 | 0.25 | 0.24 | 0.24 |
| 512 | 0.59 | 0.44 | 0.35 | 0.31 | 0.29 | 0.28 | 0.27 | 0.26 | 0.26 | 0.26 | 0.25 | 0.25 | 0.24 | 0.24 | 0.23 |
| 640 | 0.55 | 0.41 | 0.34 | 0.30 | 0.28 | 0.27 | 0.26 | 0.25 | 0.25 | 0.25 | 0.24 | 0.24 | 0.24 | 0.23 | 0.23 |
| 768 | 0.52 | 0.38 | 0.32 | 0.29 | 0.27 | 0.26 | 0.25 | 0.24 | 0.24 | 0.24 | 0.24 | 0.23 | 0.23 | 0.23 | 0.22 |
| 896 | 0.49 | 0.37 | 0.30 | 0.28 | 0.26 | 0.25 | 0.24 | 0.24 | 0.23 | 0.23 | 0.23 | 0.23 | 0.22 | 0.22 | 0.22 |
| 1024 | 0.46 | 0.35 | 0.29 | 0.27 | 0.26 | 0.25 | 0.24 | 0.24 | 0.23 | 0.23 | 0.22 | 0.22 | 0.22 | 0.22 | 0.21 |
| 1280 | 0.42 | 0.34 | 0.28 | 0.26 | 0.25 | 0.25 | 0.24 | 0.24 | 0.23 | 0.23 | 0.22 | 0.00 | 0.00 | 0.00 | 0.00 |
| 1536 | 0.40 | 0.32 | 0.27 | 0.25 | 0.24 | 0.24 | 0.24 | 0.23 | 0.24 | 0.23 | 0.00 | 0.00 | 0.00 | 0.00 | 0.00 |
| 2048 | 0.37 | 0.30 | 0.26 | 0.24 | 0.23 | 0.23 | 0.23 | 0.22 | 0.23 | 0.22 | 0.00 | 0.00 | 0.00 | 0.00 | 0.00 |
| 3072 | 0.32 | 0.28 | 0.23 | 0.23 | 0.22 | 0.22 | 0.22 | 0.21 | 0.22 | 0.21 | 0.00 | 0.00 | 0.00 | 0.00 | 0.00 |
| 4096 | 0.30 | 0.26 | 0.23 | 0.22 | 0.22 | 0.21 | 0.21 | 0.20 | 0.21 | 0.20 | 0.00 | 0.00 | 0.00 | 0.00 | 0.00 |
| 6144 | 0.28 | 0.25 | 0.22 | 0.21 | 0.21 | 0.00 | 0.00 | 0.00 | 0.00 | 0.00 | 0.00 | 0.00 | 0.00 | 0.00 | 0.00 |
| 8192 | 0.26 | 0.23 | 0.22 | 0.21 | 0.20 | 0.00 | 0.00 | 0.00 | 0.00 | 0.00 | 0.00 | 0.00 | 0.00 | 0.00 | 0.00 |
| 12288 | 0.25 | 0.22 | 0.21 | 0.00 | 0.00 | 0.00 | 0.00 | 0.00 | 0.00 | 0.00 | 0.00 | 0.00 | 0.00 | 0.00 | 0.00 |
| 16384 | 0.25 | 0.22 | 0.20 | 0.00 | 0.00 | 0.00 | 0.00 | 0.00 | 0.00 | 0.00 | 0.00 | 0.00 | 0.00 | 0.00 | 0.00 |

| Byte Address | | | | | | | | |
|---|---|---|---|---|---|---|---|---|
| | 7 | 6 | 5 | 4 | 3 | 2 | 1 | 0 |

|  | | |
|---|---|---|
|  | d9 | d8 |
|  | ⋮ | ⋮ |
|  | d3 | d2 |
| BA1+8+HA1 | d1 | d0 |
|  | ⋮ | ⋮ |
|  | c9 | c8 |
|  | ⋮ | ⋮ |
|  | c3 | c2 |
| BA1+8+HA0 | c1 | c0 |
| BA1 | | n+1 |
|  | b9 | b8 |
|  | ⋮ | ⋮ |
|  | b3 | b2 |
| BA0+8+HA1 | b1 | b0 |
|  | ⋮ | ⋮ |
|  | a9 | a8 |
|  | ⋮ | ⋮ |
|  | a3 | a2 |
| BA0+8+HA0 | a1 | a0 |
| BA0 | | n+1 |

FIG.9

STORAGE APPARATUS AND METHOD FOR PROCESSING PLURALITY OF PIECES OF CLIENT DATA

PRIORITY

This application claims priority under 35 U.S.C. § 119(a) to Korean Patent Applications filed on Feb. 11, 2015 and Mar. 12, 2015 in the Korean Intellectual Property Office and assigned Serial Nos. 10-2015-0021198 and 10-2015-0034701, respectively, the entire content of each of which is incorporated herein by reference.

BACKGROUND

1. Field of the Disclosure

The present disclosure relates generally to a storage apparatus and method of processing a plurality of pieces of client data and, more particularly, to an efficient data processing method and apparatus for collecting and transmitting client-specific data.

2. Description of the Related Art

In a communication system, amounts of data to be transmitted are different and generation times of the data are different according to clients in a data processing scheme in which different types of a plurality of pieces of client data, such as a transmitter, a receiver, and a transceiver (or a terminal), are required to be processed. In general, different pieces of client data are stored in individual memories and the size of a memory according to each piece of client data is not uniform. Accordingly, when a client-specific memory configuration is used in a conventional data processing method, memory area efficiency may deteriorate due to some small sized memories. Further, a client-specific memory configuration has an issue in that memory size increases in proportion to the amount of data to be processed by a processor at one time and has a burden of arranging and designing a larger memory since, even though an amount of data of each client varies depending on an operation scenario, the memory of each client cannot be redistributed (e.g. reallocated).

SUMMARY

An aspect of the present disclosure provides an efficient data processing method and apparatus for collecting and transmitting client-specific data.

Another aspect of the present disclosure provides a data storage method and apparatus for efficiently processing client-specific data by using memories of a multi-stage structure.

In accordance with an aspect of the present disclosure, a storage device for processing a plurality of pieces of client data is provided. The storage device includes a first stage storage unit configured to receive the plurality of pieces of client data generated in bursts from a plurality of clients and store the received plurality of pieces of client data; a second stage storage unit configured to receive the plurality of pieces of client data from the first stage storage unit and store the received plurality of pieces of client data in a plurality of memory banks shared by the plurality of clients, respectively, in bursts; and a third stage storage unit configured to receive each of the plurality of pieces of client data from the second stage storage unit and store data of a transaction unit corresponding to a transmission unit for data processing.

In accordance with another aspect of the present disclosure, a method of processing a plurality of pieces of client data in a storage device is provided. The method includes receiving the plurality of pieces of client data generated in bursts from a plurality of clients and storing the received plurality of pieces of client data in client-specific memories; receiving the plurality of pieces of client data from the client-specific memories and storing the received plurality of pieces of client data in a plurality of memory banks shared by the plurality of clients, respectively, in bursts; and receiving the plurality of client data stored in the plurality of memory banks and storing data of a transaction unit corresponding to a transmission unit for data processing in a destination memory.

In accordance with another aspect of the present disclosure, a chipset of processing a plurality of pieces of client data in a storage device is provided. The chipset is configured to receive the plurality of pieces of client data generated in bursts from a plurality of clients and storing the received plurality of pieces of client data in client-specific memories; receive the plurality of pieces of client data from the client-specific memories and storing the received plurality of pieces of client data in a plurality of memory banks shared by the plurality of clients, respectively, in bursts; and receive the plurality of pieces of client data stored in the plurality of memory banks and storing data of a transaction unit corresponding to a transmission unit for data processing in a destination memory.

BRIEF DESCRIPTION OF THE DRAWINGS

The above and other aspects, features, and advantages of the present disclosure will be more apparent from the following detailed description, taken in conjunction with the accompanying drawings, in which:

FIG. 6 is a chart of memory area required per bit based on a memory size according to an embodiment of the present disclosure;

DETAILED DESCRIPTION OF EMBODIMENTS OF THE PRESENT DISCLOSURE

In the following description of embodiments of the present disclosure, a detailed description of known functions or configurations incorporated herein is omitted when a detailed description thereof may unnecessarily obscure the subject matter of the present disclosure.

First, in a communication system, a transmitter, a receiver, or a transceiver (hereinafter, each referred to as a "terminal") may include at least one processor operating based on software and at least one hardware block (or function block) designed to perform predetermined operations. Between a hardware block and a processor (or a subsystem of a processor), information is exchanged. Some values acquired by a hardware block according to a data calculation may be transmitted to and processed by a processor, and the data transmitted to and processed by the processor may have various types according to a characteristic of the hardware block. Various types of data should be transmitted to the processor within a time after being periodically or aperiodically generated by a hardware block. In a communication system, various types of data may include transmission/reception In-phase (I)/Quadrature (Q) data for calibration, data on a processing result of a cell searcher, a channel estimation value of a receiver, an adaptive filter weight of an equalizer, a channel decoding result, and the like.

Assuming that a plurality of hardware blocks, which simultaneously operate, correspond to a plurality of clients and different pieces of data, which are generated by a plurality of hardware blocks, correspond to different pieces of client data, a conventional data storage device and data processing method for processing different pieces of client data is described below to assist in understanding of the present disclosure with reference to FIGS. 1A and 1B. Hereinafter, various embodiments of the present disclosure are described based on a storage device used in a terminal of a communication system, but the storage device according to various embodiments of the present disclosure may be equally applied to various systems in which a request for collecting, transmitting, and processing data is made by a plurality of clients.

Figure 1A:
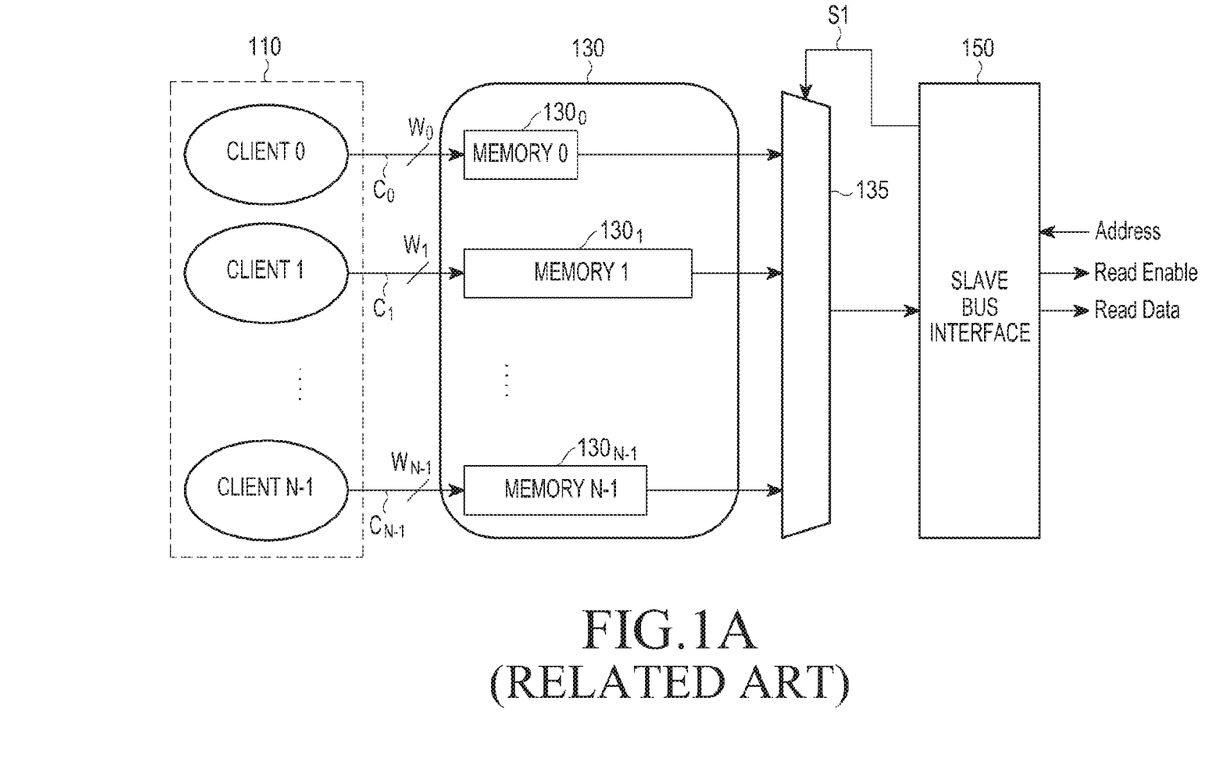
FIG. 1A is a block diagram of a data storage device for processing a plurality of pieces of client data in a communication system.

FIG. 1A is a block diagram of a data storage device for processing a plurality of pieces of client data in a communication system, where FIG. 1A corresponds to a data storage device using a slave bus interface structure.

Referring to FIG. 1A, a plurality of pieces of client data $C_0$ to $C_{N-1}$ generated by a plurality of clients (e.g. clients 0 to N−1) 110 are stored in memories $130_0$ to $130_{N-1}$ corresponding to the plurality of clients within a storage unit 130. The client-specific memories (e.g. memories 0 to N−1) $130_0$ to $130_{N-1}$ have different memory sizes according to bit widths $W_0$ to $W_{N-1}$ of the data $C_0$ to $C_{N-1}$ generated by the corresponding clients and amounts of data generated per unit time. Further, a processor may read data, which is output from the client-specific memories $130_0$ to $130_{N-1}$ and multiplexed by a multiplexer 135, through a slave bus interface 150. In FIG. 1A, reference numeral S1 indicates a selection of a memory from the client-specific memories $130_0$ to $130_{N-1}$ from which to read data in a slave bus interface 150 structure.

Figure 1B:
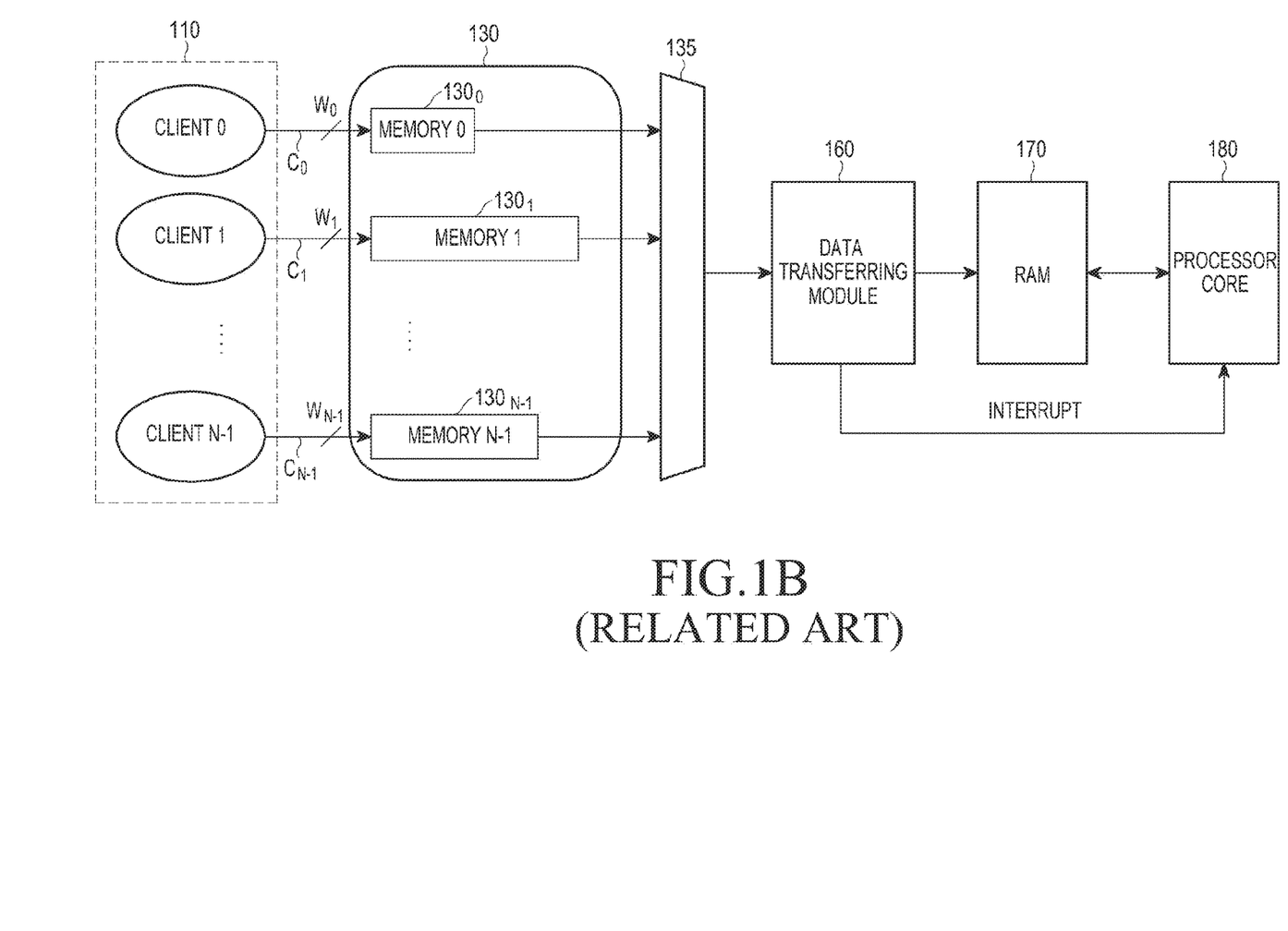
FIG. 1B is a block diagram of a data storage device for processing a plurality of pieces of client data in a communication system.

FIG. 1B is a block diagram of the data storage device for processing a plurality of pieces of client data in the communication system, and the configuration of FIG. 1B corresponds to a data storage device using a Direct Memory Access (DMA) bus interface structure in which data input/output is performed through an interrupt.

Referring to FIG. 1B, a plurality of pieces of client data $C_0$ to $C_{N-1}$ generated by a plurality of clients (e.g. clients 0 to N−1) 110 are stored in memories $130_0$ to $130_{N-1}$ corresponding to the plurality of clients within a storage unit 130. The client-specific memories (e.g. memories 0 to N−1) $130_0$ to $130_{N-1}$ have different memory sizes according to the amounts of the different pieces of client data $C_0$ to $C_{N-1}$. Data, which is output from the client-specific memories $130_0$ to $130_{N-1}$ and multiplexed by a multiplexer 135, is transferred to a processor core 180 such as a Digital Signal Processor (DSP) or a Central Processing Unit (CPU) via a data transferring module 160 for generating an interrupt and a Random Access Memory (RAM) 170.

In FIGS. 1A and 1B, the client-specific memories $130_0$ to $130_{N-1}$ within the storage unit 130 are implemented as, for example, an on-chip memory such as a flip-flop or a Static Random Access Memory (SRAM), and have the following issue. Specifically, one client memory of the client-specific memories $130_0$ to $130_{N-1}$ stores an amount (hereinafter, referred to as "1 transaction") of data to be processed in software at once (or simultaneously). Since, as the client memory, the flip-flop occupies the widest memory area per bit and the SRAM also occupies a relatively wide area per bit, the client memory has a silicon area which increases as transaction size increases.

Further, the SRAM used as the client memory includes control logic for designating a cell for decoding and accessing an address to read and write data as well as a cell matrix for storing data. While the size of the cell matrix increases in proportion to the number of bits of the stored data, the size of the control logic gradually increases as the cell matrix increases, so that the silicon area occupied per bit increases as memory capacity decreases and thus memory area efficiency decreases. In a conventional method of implementing a client memory, there are variations in the client memory since the amounts of client data differ. Further, when a client memory is a very small memory, the silicon area occupied per bit increases and thus total area efficiency decreases. Since each client memory is fixedly mapped to a certain client, it is difficult to efficiently re-allocate the client memory according to an operation condition. Further, in a conventional method of implementing a client memory, the amounts of data generated by each hardware block (that is, the client) vary according to various operational scenarios, and the total memory area required increases in that each client memory should be designed based on the largest amount of data required in all of the operational scenarios.

In an embodiment of the present disclosure, a storage device using a memory of a multi-stage structure reduces memory area by using traffic characteristics of client data transmitted from a plurality of clients. The client-specific data may be understood to be different types of data processed by a terminal using the storage device.

Further, the storage device according to an embodiment of the present disclosure restrictively stores data such that most pieces of data among the data to be processed by a processor at once are stored in a low cost memory and data generated at once are stored in a high cost memory for rapid storage. The storage device reduces the use of small capacity memory having a low memory area efficiency and to improve total memory area efficiency by using a memory having at least a predetermined capacity.

When the memory demand of each client changes according to various operational scenarios, the storage device according to an embodiment of the present disclosure may easily change the memory allocation amount of each client through a configuration register.

Figure 2:
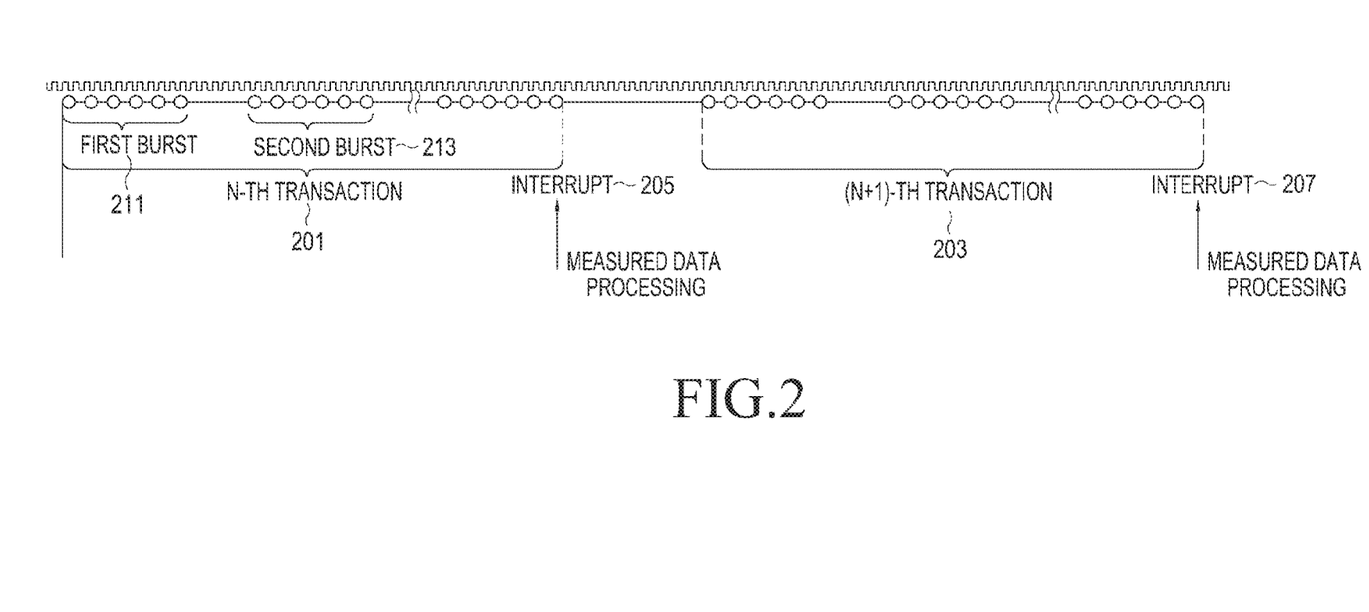
FIG. 2 illustrates a pattern of data generated by a certain client.

FIG. 2 illustrates data generated by a particular client. Referring to FIG. 2, after transmitting data, the client generates interrupts 205 and 207 and requests processing from a processor. The processor gathers data corresponding to one transaction 201 or 203 and processes the data at once, but actual data is generated in small bursts 211 and 213. Accordingly, in an embodiment of the present disclosure, each client first stores one burst of data in an intermediate memory and stores the total amount of generated data of one transaction in a destination memory having a small implementation cost. The destination memory may use an external Dynamic Random Access Memory (DRAM) or an SRAM, where area efficiency increases due to the larger size of the total data. In an embodiment of the present disclosure, the burst data may be understood as, for example, a unit of data generated by one client, and the transaction may be understood as a unit of data (e.g., a transmission unit) processed (for example, a unit of data transferred to software for performing a task) by a processor.

Figure 3:
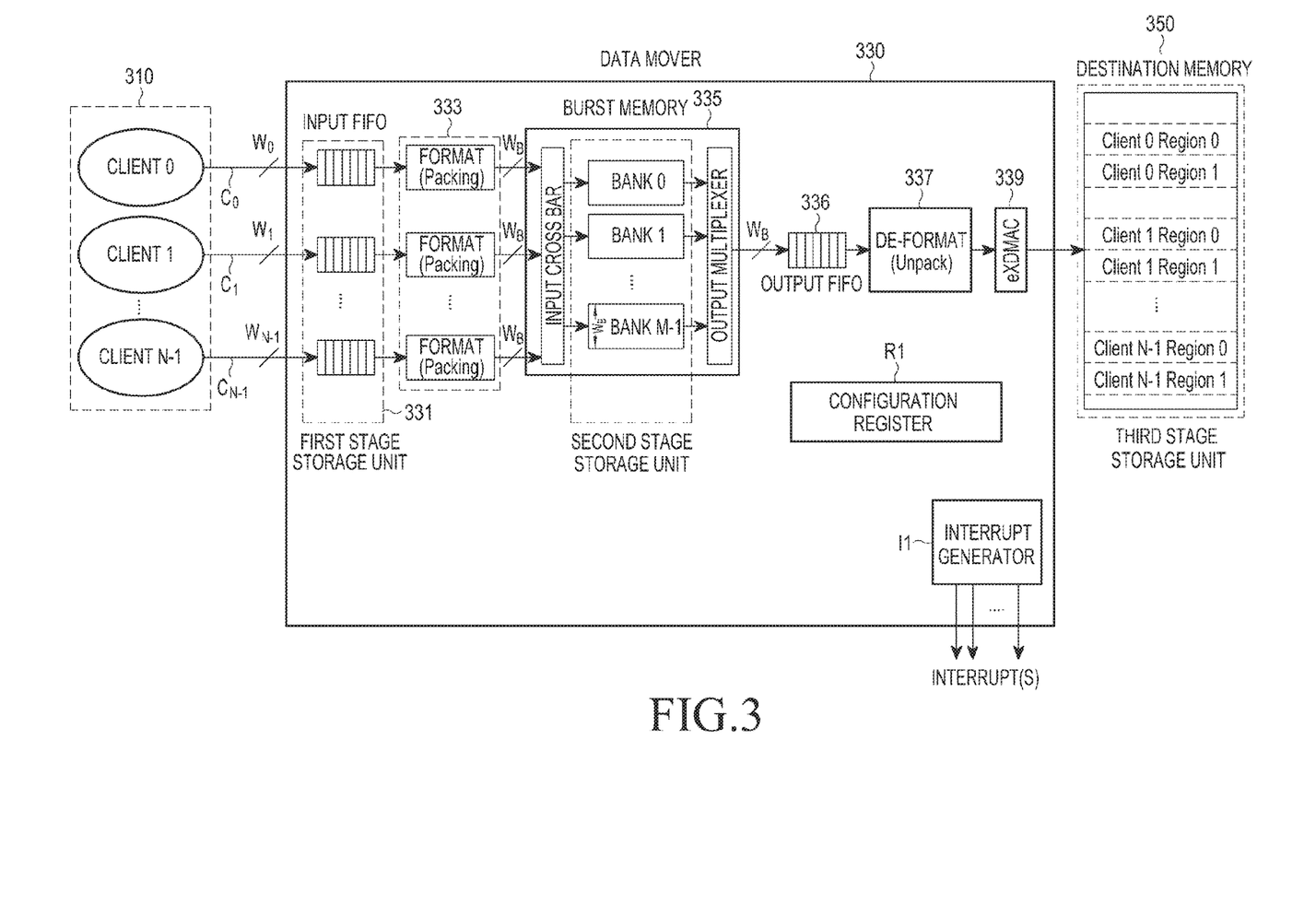
FIG. 3 is a block diagram of a data storage device for processing a plurality of pieces of client data in a communication system according to an embodiment of the present disclosure.

FIG. 3 is a block diagram of a data storage device for processing a plurality of pieces of client data in a communication system according to an embodiment of the present disclosure, where the storage device includes memories of a multi-stage structure.

The storage device of FIG. 3 includes a data mover 330 for receiving different types of client data $C_0$ to $C_{N-1}$ generated by a plurality of clients (e.g. clients 0 to N−1) 310 corresponding to a plurality of hardware blocks within a terminal, temporarily storing the client data $C_0$ to $C_{N-1}$, and then outputting the client data $C_0$ to $C_{N-1}$ to a destination memory 350. The data mover 330 may include a first stage storage unit including client-specific First In First Out (FIFO) memories 331 and a second stage storage unit for storing the plurality of pieces of client data $C_0$ to $C_{N-1}$ transferred from the first stage storage unit in the unit of one burst, the second stage storage unit including a burst memory 335 for outputting stored burst data to the destination memory 350 before next burst data is input. The destination memory 350 may use an external memory or the like, and is used as a third stage storage unit. According to an embodiment of the present disclosure, the storage device including the memories of the multi-stage structure in which different types of a plurality of pieces of client data are processed may include the first stage to third stage storage units. The different types of client data $C_0$ to $C_{N-1}$ input into the FIFO memories 331 may have different data amounts. Meanwhile, although it has been described that the plurality of pieces of client data $C_0$ to $C_{N-1}$ transferred from the first stage storage unit are stored in the burst memory 335 in the unit of one burst according to the above embodiment, it is only an example and the present disclosure is not limited thereto. Accordingly, the client data may be stored in the burst memory 335 in units of at least two bursts.

In a detailed description of the data mover 330 of FIG. 3, the input FIFO memories 331 operating as the first stage storage unit receive different pieces of N client data $C_0$ to $C_{N-1}$ from the N clients 310 and first store the N client data $C_0$ to $C_{N-1}$ in the input FIFO memories 331, which are allocated to the clients, respectively. The client-specific data stored in the client-specific FIFO memories 331 are formatted in a predetermined scheme of formatting 333 and input and stored in the burst memory 335 operating as the second stage storage unit. The formatting 333 is for efficiently using the memories by gathering data input when the data widths $W_0$ to $W_{N-1}$ of the client data are less than a memory bank width $W_B$ within the burst memory 335 and then adjusting the data widths to the memory bank width $W_B$.

According to an embodiment of the present disclosure, the burst memory 335 stores one burst per client, so that an amount of data to be stored in the burst memory 335 is significantly reduced compared to storing all of one transaction. The burst memory 335 uses a relatively high cost memory. Accordingly, the burst memory 335 is implemented to store data in the unit of bursts, corresponds to the data generation unit of the client according to an embodiment of the present disclosure. When one burst is completely stored in the burst memory 335, the burst memory 335 outputs the pre-stored burst to a third stage storage unit before the next burst is generated and the existing data is overwritten. Each piece of the client data stored in the burst memory 335 corresponding to the second stage storage unit may be transferred to the third stage storage unit during a time interval between adjacent bursts. For example, when the time interval between the bursts is longer than a predetermined time, the data may be transmitted to the third stage storage unit during the time interval. In another example, when the time interval between the bursts is shorter than the predetermined time or when there is no time interval between the bursts, a memory space corresponding to two bursts may be secured in the second stage storage unit and the first burst of the two bursts may be transmitted to the third stage storage unit while the second burst is recorded in the second stage storage unit. The latter example may be understood as a double buffering operation as described below.

Further, the third stage storage unit uses a relatively low cost memory. Accordingly, in an embodiment of the present disclosure, data may be stored in a transaction unit, which is a unit of data (e.g. a transmission unit) processed by a processor (for example, a unit of data transferred to software by a processor). The software may process the data of the transaction unit at once.

According to an embodiment of the present disclosure, when the client data is stored in the high cost burst memory, the entire data of the transaction amount, which is a transmission unit, is not stored, because only a burst amount of data generated may be stored simultaneously. Further, the burst data is transferred to and stored in the low cost memory during a time interval between adjacent bursts. Therefore, cost-effectiveness of the memory may be improved.

When a time interval between a current burst and a next burst is very short and thus there is not enough time to transmit data to the third stage storage unit, double buffering is performed to store, for example, two or more burst amounts of the corresponding client data (that is, data having an insufficient time to be transmitted to the third stage storage unit) in the second stage storage unit, which addresses the issue of a short time interval between bursts.

Further, the storage device of FIG. 3 may include a configuration register R1 for storing a configuration for processing each piece of client data. The configuration register R1 may include at least one of the rules for processing each piece of client data, for example, a start address of each piece of client data in the burst memory 335, an address of the destination memory 350 in which each piece of client data is finally stored, and a scheme of de-formatting 337 corresponding to the scheme of the formatting 333. In FIG. 3, the output FIFO 336 may temporarily store data read from the burst memory 335, and each piece of client data output from the output FIFO 336 is transferred to the third stage storage unit through an eXternal DMA Controller (eXDMAC) 339, which is the DMA controller, via the de-formatting 337. Further, each client may make a request for generating an interrupt in a particular burst by using control information transferred to the data mover 330, and an interrupt generator I1 for processing the interrupt may be included in the storage device of FIG. 3.

In FIG. 3, the third stage storage unit, which is the destination memory 350, corresponds to an address space that may be accessed by a processor as a final destination to which data is transmitted. The third stage storage unit may use, for example, a DRAM external to an IC or chip or a large capacity data memory of a certain processor within the chip, and receive data through the eXDMAC 339 corresponding to the DMA controller. The third stage storage unit stores one transaction per client for data processing by a processor, and has a relatively low implementation cost per bit compared to the first stage storage unit or the second stage storage unit, thereby reducing an overall implementation cost. If there is a issue that data may be overwritten since processing by a processor is delayed and thus subsequent transaction data may be transmitted before one transaction processing of prior transaction data ends, double buffering may be performed by securing a space to store two or more transactions in the third stage storage unit. The operation of the storage device including the first stage to third stage storage units may be controlled through a controller.

Figure 4:
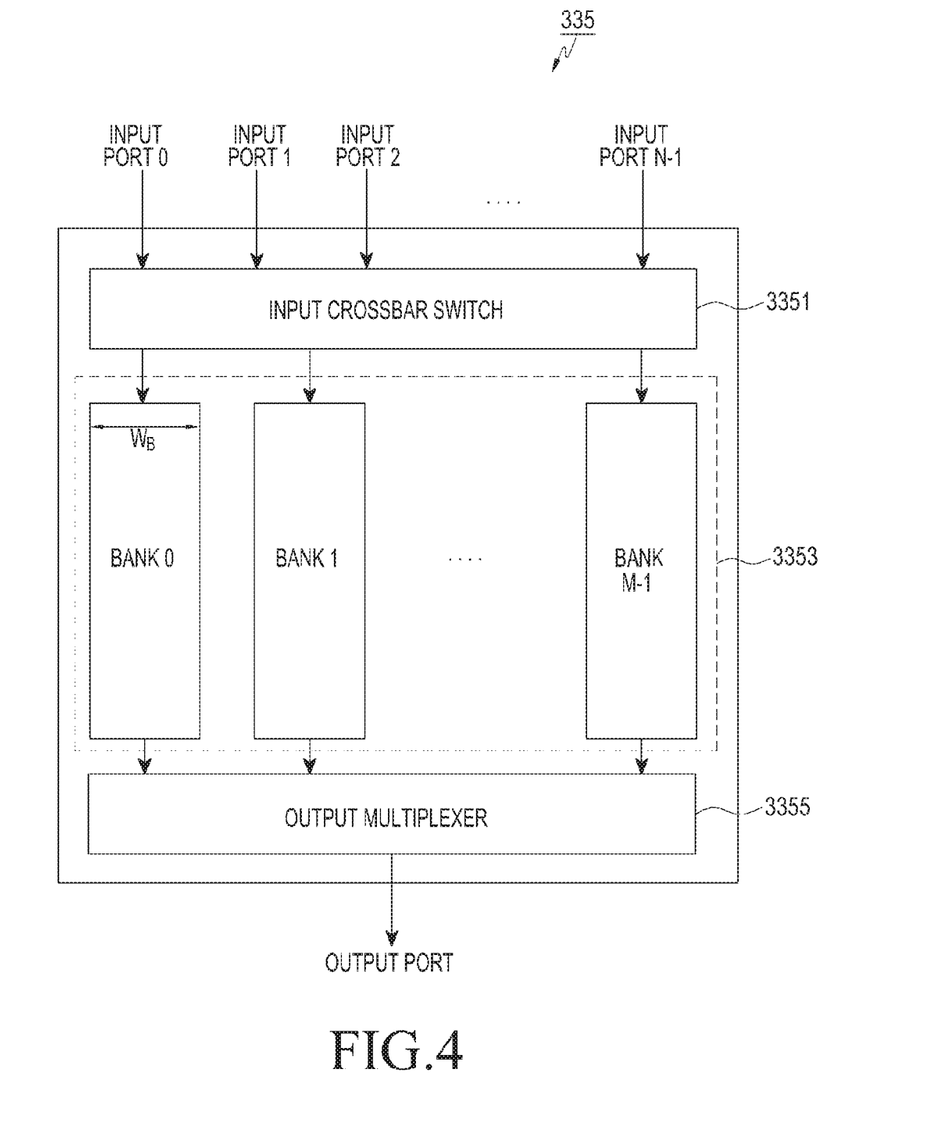
FIG. 4 is a block diagram of a burst memory operating as a second stage storage unit in the data storage device of FIG. 3 according to an embodiment of the present disclosure.

FIG. 4 is a block diagram of the burst memory 335 operating as the second stage storage unit in the data storage device of FIG. 3 according to an embodiment of the present disclosure.

Referring to FIG. 4, the burst memory 335 includes an input crossbar switch 3351, a plurality of memory banks (e.g. bank 0 to M−1) 3353, and an output multiplexer 3355. N input ports are connected to the M memory banks 3353 via the input crossbar switch 3351, wherein N<M. That is, the number of memory banks is greater than the number of input ports. According to an embodiment of the present disclosure, each memory bank 3353 has, for example, a width of $W_B$ bits. Each input port is controlled to be connected to a certain memory bank 3353. Further, the output multiplexer 3355 selects one of the M memory banks 3353 as an output of the output port.

According to an embodiment of the present disclosure, any region of the burst memory 335 may be allocated to a client, and the start address of each client in the memory banks 3353 may be set in the configuration register R1. A configuration may be changed during the operation of the terminal and re-set according to an operational scenario. Accordingly, the total size of the burst memory 335 may be designed based on an operational scenario in which a sum of the burst amounts of all clients becomes a maximum, and the burst memory 335 may be dynamically re-distributed to the clients through the configuration register R1 in another operational scenario. According to an embodiment of the present disclosure, a method of allocating the burst memory 335 may secure a memory space with the maximum burst size and reduce a required area of the memory with respect to each client.

Figure 5:
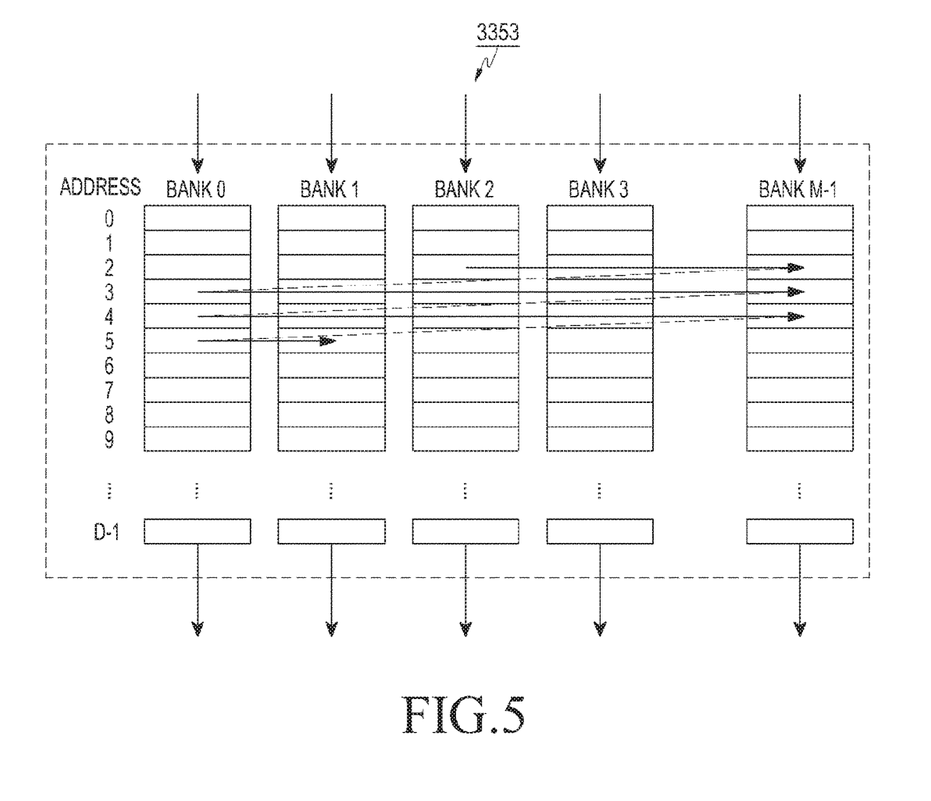
FIG. 5 is a block diagram of an access pattern of a memory banks in the burst memory of FIG. 4 according to an embodiment of the present disclosure.

FIG. 5 is a block diagram of an access pattern of the memory banks 3353 in the burst memory 335 of FIG. 4 according to an embodiment of the present disclosure.

Referring to FIG. 5, for example, when a client accesses the burst memory 335, the client sequentially accesses all the memory banks 3353 in a horizontally striping pattern. In this case, since one client accesses a certain memory bank only once every M cycles, if the input crossbar switch 3351 is scheduled such that two or more clients do not access two memory banks 3353 at the same time, a maximum of M clients may simultaneously access the memory banks 3353 without collision therebetween. Further, since reading of the data stored in the burst memory 335 is processed in the unit of one client, N, which is the number of clients writing data in the burst memory 335, should be less than M, which is the number of memory banks 3353.

Table 1 below shows an example of an allocation to each client by the input crossbar switch 3351 according to an embodiment of the present disclosure, for example, an allocation of memory banks 3353 where the number of clients is 8.

TABLE 1

| | bank allocation according to each time slot | | | | | | | |
|---|---|---|---|---|---|---|---|---|
| | ts 0 | ts 1 | ts 2 | ts 3 | ts 4 | ts 5 | ts 6 | ts 7 |
| Client 0 | 0 | 1 | 2 | 3 | 4 | 5 | 6 | 7 |
| Client 1 | 7 | 0 | 1 | 2 | 3 | 4 | 5 | 6 |
| Client 2 | 6 | 7 | 0 | 1 | 2 | 3 | 4 | 5 |
| Client 3 | 5 | 6 | 7 | 0 | 1 | 2 | 3 | 4 |
| Client 4 | 4 | 5 | 6 | 7 | 0 | 1 | 2 | 3 |
| Client 5 | 3 | 4 | 5 | 6 | 7 | 0 | 1 | 2 |
| Client 6 | 2 | 3 | 4 | 5 | 6 | 7 | 0 | 1 |
| Client 7 | 1 | 2 | 3 | 4 | 5 | 6 | 7 | 0 |

As shown in Table 1 above, by defining eight clock cycles as eight time slots and allocating the time slots in a round-robin scheme, scheduling without collision may be achieved. In this case, since it takes a maximum of seven clocks up to an allocated time slot to initiate data transmission by a certain client, each client requires an input buffer (that is, the input FIFO 331 of FIG. 3) for storing the data. The client-specific input FIFO 331, which is the first stage storage unit, serves to store data, which is irregularly generated by each client, without any loss and transmit the stored data to the burst memory 335 on consecutive cycles.

FIG. 6 is a chart of memory area (e.g. unit: gate count) required per bit based on memory sizes according to an embodiment of the present disclosure. One gate indicates an area of a NAND gate having two inputs.

Referring to FIG. 6, in a case of a memory having a smallest size (e.g. width 4 and depth 32), a memory area is 3.83 gates/bit. The memory area is reduced as the memory size becomes larger and thus the memory area converges to 0.20 gates/bit. It is noted from the example of FIG. 6 that there may be a difference of up to 19 times in the memory area of memories of different sizes. Further, when the memory size is greater than or equal to a predetermined size, the memory area may be rapidly reduced to a level of 0.2-0.3 gates/bit. Accordingly, in terms of the reduction in the memory area, implementing the memory banks 3353 to have a uniform memory size is more advantageous rather than implementing the memory banks 3353 to have various memory sizes as illustrated in the examples of FIGS. 1A and 1B. Therefore, in an embodiment of the present disclosure, the memory sizes of the memory banks 3353 are uniformly configured regardless of an amount of data generated by each client.

In addition, according to an embodiment of the present disclosure, each client may transmit additional information as well as client data to be transmitted to the destination memory 350.

Figure 7:
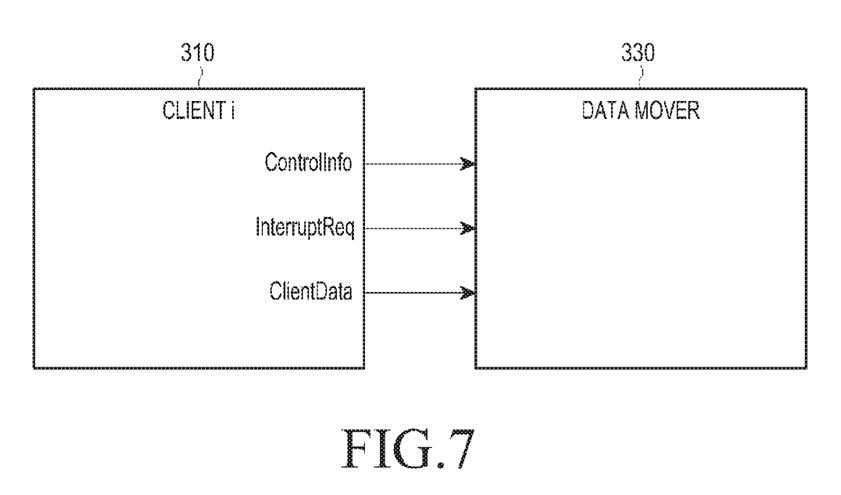
FIG. 7 is a block diagram of an interface between a client and a data mover in the data storage device of FIG. 3 according to an embodiment of the present disclosure.

FIG. 7 is a block diagram of an interface between a client and the data mover 330 in the data storage device of FIG. 3 according to an embodiment of the present disclosure.

Referring to FIG. 7, FIG. 7 corresponds to an example in which control information (ControlInfo) and an interrupt request signal (InterruptReq) as well as client data (ClientData) of $W_i$ bits are transferred to the data mover 330 from client i 310 through the interface.

Table 2 below shows an example of the control information.

TABLE 2

| ControlInfo[1:0] | definition | Data format in the oAddrOrData port |
|---|---|---|
| 00 | No action | Don't care |
| 01 | Head address | $[W_A-1:0]$ Address $(W_A \leq W_B)$ |
| 10 | Data | $[Wi-1:0]$ Data $(W \leq W_B)$ |
| 11 | End of a burst | Don't care |

Figure 8:
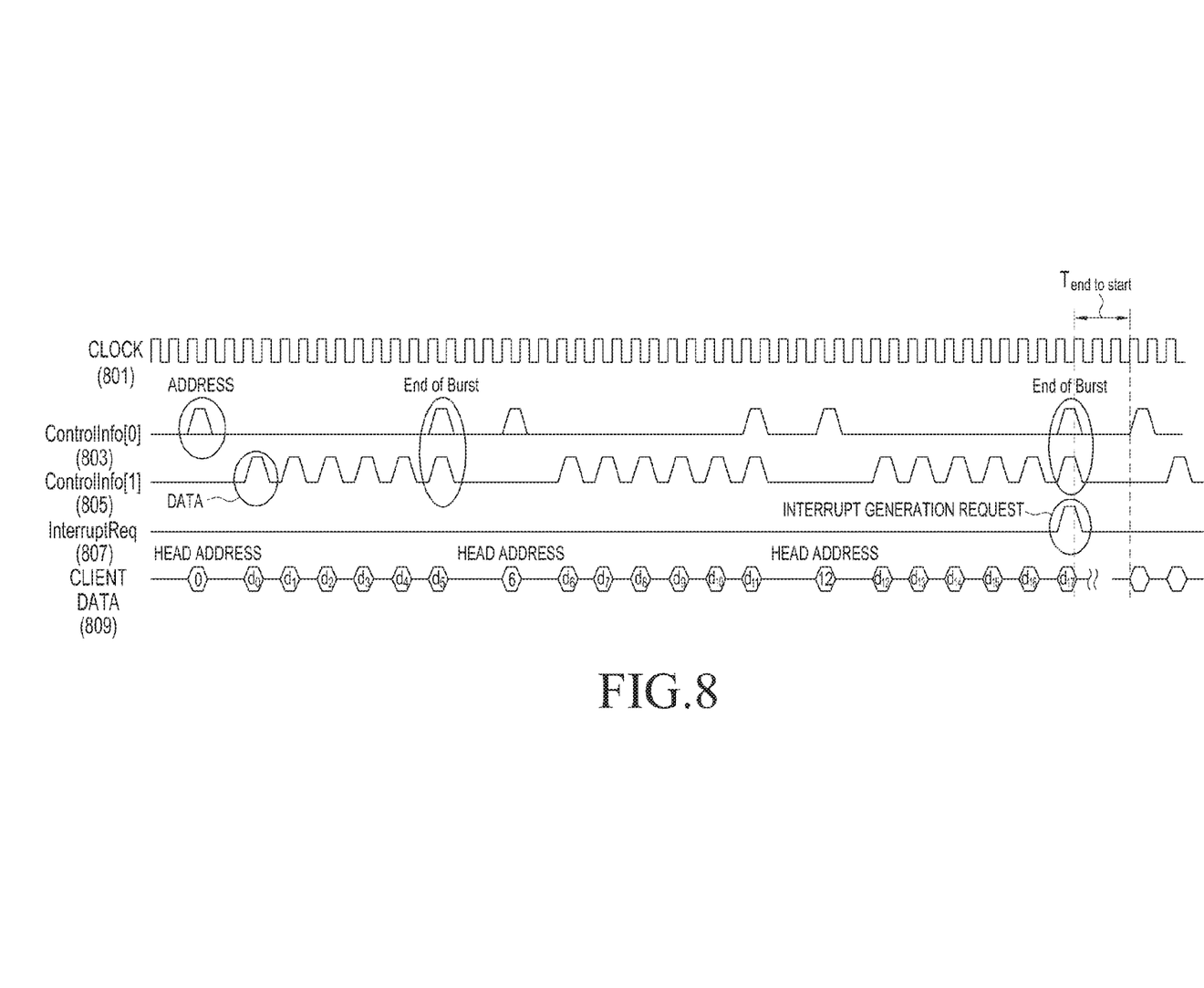
FIG. 8 is a timing diagram of a client data transmission operation in the data storage device of FIG. 3 according to an embodiment of the present disclosure.

FIG. 8 is a timing diagram of a client data transmission operation in the data storage device of FIG. 3 according to an embodiment of the present disclosure, and the timing diagram of FIG. 8 illustrates an example of transmitting client data by using control information of Table 2 above. For example, when ControlInfo[1:0] is "10" in Table 2 above, ControlInfo[1] corresponds to "1" and ControlInfo[0] corresponds "0" in FIG. 8.

Referring to FIG. 8 with reference to FIG. 7, reference numeral 801 is a clock signal, reference numerals 803 and 805 are control information, reference numeral 807 is an interrupt request signal, and reference numeral 809 is client data. Client i 310 maintains the control information (ControlInfo) as "00" in a standby state. When starting initial transmission, client i 310 transmits control information ControlInfo[0] 803 with, for example "1," and transmits a head address to start data storage in the destination memory 350. Thereafter, when transmitting client data 809, client i 310 transmits the control information ControlInfo[1] 805 with "1" and informs the data mover 330 that the client data 809 is effective. Client i 310 transmits control information "1" after one burst is completely transmitted. The data mover 330 having received the control information "11" identifies the end of a burst and then starts data transmission to the destination memory 350 by driving the eXDMAC 339 which is the DMA controller. When client i 310 transmits the interrupt request signal (InterruptReq) 807 with "1" at the end of a certain burst, the data mover 330 generates an interrupt and notifies a processor that the data transmission of the corresponding client is completed after transmission of the corresponding burst is completed. Reference numeral $T_{end\ to\ start}$ refers to a time between one burst and a next burst in FIG. 8.

Figure 9:
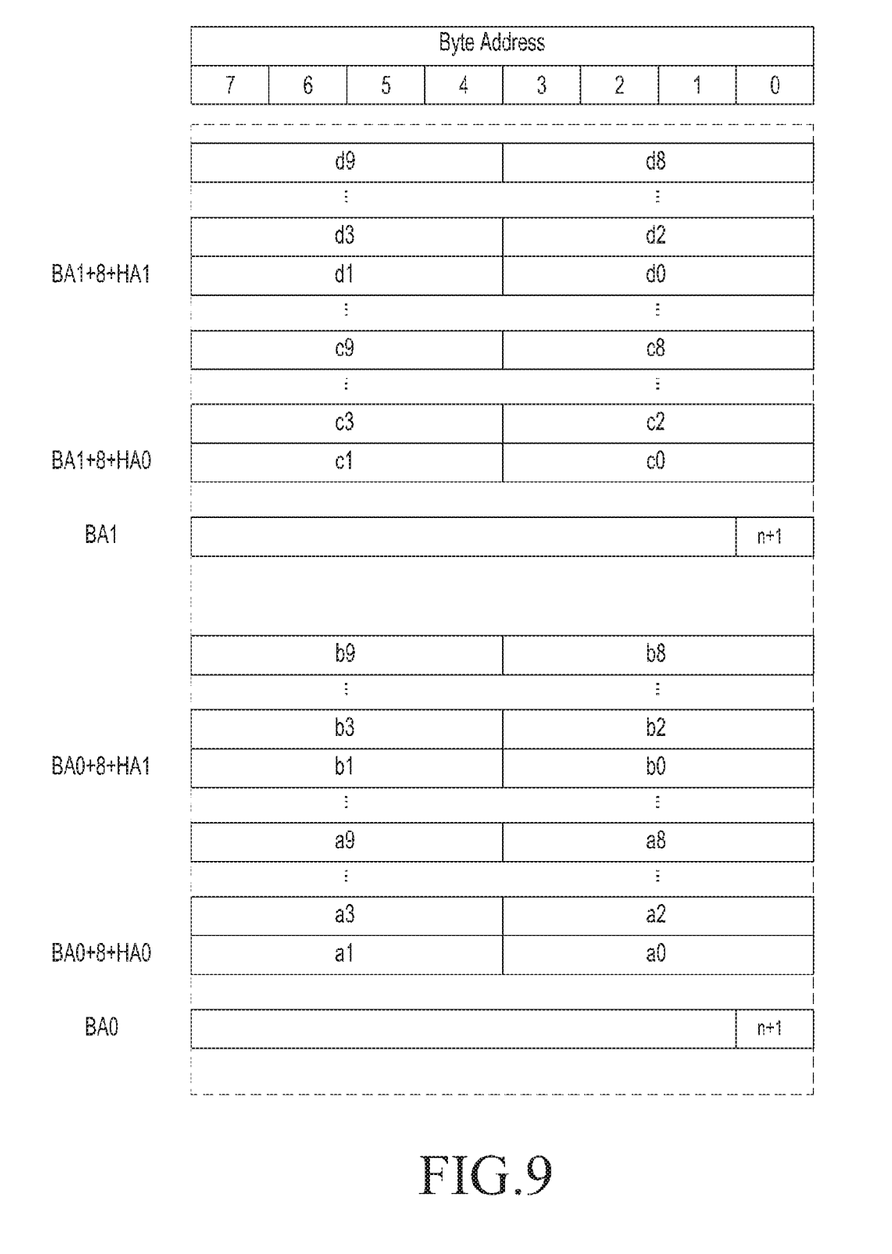
FIG. 9 illustrates client data stored in a destination memory in the data storage device of FIG. 3 according to an embodiment of the present disclosure.

FIG. 9 illustrates client data stored in a destination memory 350 in the data storage device of FIG. 3 according to an embodiment of the present disclosure.

Referring to FIG. 9, two base addresses BA0 and BA1 may be designated in the configuration register R1 of FIG. 3 per client, and the destination memory 350 may perform double buffering when the two base addresses are different. In an embodiment of the present disclosure, each burst results in the storing of data starting at a location corresponding to a sum of the base address and a head address (HA0, HA1, . . . ) transmitted by each client. In addition, the data storage unit 350 may store additional information to allow a processor to easily process the data. In FIG. 9, "n+1" indicates a transaction number. The transaction number is used for identifying whether data of a new transaction is completely transmitted without using an interrupt. It is assumed that the transaction number uses a value incremented by 1 whenever an interrupt is generated for each client. A processor identifies whether the transaction number is updated instead of processing the interrupt, so as to determine whether all pieces of data are completely transmitted and reduce processing time.

The storage device using the memories of the multi-stage structure (that is memories of the hierarchical structure) according to an embodiment of the present disclosure includes the first to third stage storage units sequentially connected. The first stage storage unit may be implemented by FIFO memories 331 using a flip-flop or a memory for each client to store data of each client, which operate independently. Through the use of the first stage storage unit, the data may be stored without data loss within a standby time before recording is initiated in the second stage storage unit.

Further, the second stage storage unit stores one or more bursts generated for each client, but may be implemented by the burst memory 335 including a plurality of memory banks 3353, which may be shared by a plurality of clients to reduce implementation cost of the storage device. The plurality of memory banks 3353 have a uniform memory size to reduce memory area, and simultaneously read client data transferred from the first stage storage unit to simultaneously record the client data in the plurality of memory banks, thereby preventing a collision when pre-stored data is transmitted to the third stage storage unit. Further, the second stage storage unit may dynamically change memory allocation of each client by changing a location and a data amount of the client-specific data stored in the burst memory 335 through a software configuration (for example, change through the configuration register R1). The memory area may be reduced through the use of the configuration of the second stage storage unit. Further, in order to increase the area efficiency of the storage device, a traffic characteristic of the data generated by each client may be used.

The third stage storage unit may store data of the transaction unit, which is the processing unit of a processor, and may store data of two or more transaction amounts for each client. The third stage storage unit may use an external memory having a relatively low implementation cost or an on-chip memory (for example, memory embedded in a processor), and may perform double buffering by using two or more base addresses in a scheme of storing data of each client in a particular location of the destination memory. Further, the data processing may be easily performed through automatic transmission of additional information to the particular location of the third stage storage unit. The additional information may be various types of information helpful to process other data such as the transaction number and the like.

In an embodiment of the present disclosure, a storage device and method is provided using shared memories of a multi-stage structure which can efficiently process data of all clients in a communication system in which data generated by a plurality of hardware blocks should transmit data to a certain memory.

In an embodiment of the present disclosure, a memory access scheme of a storage device is provided using memories of a multi-stage structure, and a total memory area efficiency is improved by reducing the use of a small memory and using a memory having a predetermined larger size for large capacity data through such a configuration. Further, when amounts of client-specific data generated vary depending on an operational scenario, a memory amount allocated to each client can be efficiently re-allocated.

While the present disclosure has been shown and described with reference to certain embodiments thereof, it will be understood by those skilled in the art that various modifications in form and detail may be made therein without departing from the scope and spirit of the present disclosure, which is defined by the appended claims and their equivalents.

What is claimed is:

1. A storage device for processing a plurality of pieces of client data, the storage device comprising:
    a first stage storage unit configured to receive the plurality of pieces of client data generated in bursts from a plurality of clients and store the plurality of pieces of client data;
    a second stage storage unit configured to receive the plurality of pieces of client data from the first stage storage unit and store the plurality of pieces of client data in a plurality of memory banks shared by the plurality of clients, respectively, in bursts; and
    a third stage storage unit configured to receive each of the plurality of pieces of client data from the second stage storage unit and store the each of the plurality of pieces of client data as data of a transaction unit corresponding to a transmission unit for data processing,
    wherein the plurality of memory banks are placed in the second stage storage unit;
    wherein the plurality of pieces of client data are simultaneously stored in the plurality of memory banks in bursts;
    wherein a number of the plurality of memory banks is greater than a number of the plurality of clients,
    wherein the third stage storage unit performs double buffering by using a plurality of base addresses when storing each of the plurality of pieces of client data, and
    wherein each of the plurality of pieces of client data stored in the second stage storage unit is transferred to the third stage storage unit during a time interval between adjacent bursts.

2. The storage device of claim 1, wherein the plurality of clients corresponds to a plurality of processors which independently operate, and wherein the plurality of pieces of client data include different types of data.

3. The storage device of claim 1, wherein the first stage storage unit includes memories corresponding to the plurality of clients, respectively, which store the plurality of pieces of client data.

4. The storage device of claim 1, wherein the first stage storage unit stores the plurality of pieces of client data if the second stage storage unit can initiate a record.

5. The storage device of claim 1, wherein the plurality of memory banks has a uniform memory size.

6. The storage device of claim 1, wherein locations and data amounts of the plurality of pieces of client data stored in the plurality of memory banks can be changed by a software configuration.

7. The storage device of claim 6, wherein the second stage storage unit includes a configuration register, and wherein the software configuration is changed through the configuration register.

8. The storage device of claim 1, wherein memory allocation of the plurality of memory banks to each of the plurality of clients is dynamically changed.

9. The storage device of claim 1, wherein the third stage storage unit uses an external memory or an on-chip memory included within a processor.

10. The storage device of claim 1, wherein additional information transferred to a certain address of the third stage storage unit is used for data processing by a processor.

11. A method of processing a plurality of pieces of client data in a storage device, the method comprising:
    receiving, by a first stage storage unit, the plurality of pieces of client data generated in bursts from a plurality of clients and storing the plurality of pieces of client data in client-specific memories;
    receiving, by a second stage storage unit, the plurality of pieces of client data from the client-specific memories and storing the plurality of pieces of client data in a plurality of memory banks shared by the plurality of clients, respectively, in bursts; and
    receiving each of the plurality of pieces of client data stored in the plurality of memory banks and storing the each of the plurality of pieces of client data as data of a transaction unit corresponding to a transmission unit for data processing in a third stage storage unit,
    wherein the plurality of memory banks are placed in the second stage storage unit;
    wherein the plurality of pieces of client data are simultaneously stored in the plurality of memory banks in bursts;
    wherein a number of the plurality of memory banks is greater than a number of the plurality of clients,
    wherein the third stage storage unit performs double buffering by using a plurality of base addresses when storing each of the plurality of pieces of client data, and
    wherein each of the plurality of pieces of client data stored in the second stage storage unit is transferred to the third stage storage unit during a time interval between adjacent bursts.

12. The method of claim 11, wherein the plurality of clients corresponds to a plurality of processors which independently operate, and wherein the plurality of pieces of client data include different types of data.

13. The method of claim 11, wherein receiving the plurality of pieces of client data comprises receiving the plurality of pieces of client data in memories corresponding to the plurality of clients, respectively, which store the plurality of pieces of client data.

14. The method of claim 11, receiving the plurality of pieces of client data comprises receiving the plurality of pieces of client data in memories corresponding to the plurality of clients, respectively, which store the plurality of pieces of client data if the second stage storage unit can initiate a record.

15. The method of claim 11, wherein the plurality of memory banks has a uniform memory size.

16. A chipset for processing a plurality of pieces of client data in a storage device, wherein the chipset is configured to:
    receive, by a first stage storage unit, the plurality of pieces of client data generated in bursts from a plurality of clients and store the plurality of pieces of client data in client-specific memories;
    receive, by a second stage storage unit, the plurality of pieces of client data from the client-specific memories and store the plurality of pieces of client data in a plurality of memory banks shared by the plurality of clients, respectively, in bursts; and
    receive each of the plurality of pieces of client data stored in the plurality of memory banks and store the each of the plurality of pieces of client data as data of a transaction unit corresponding to a transmission unit for data processing in a third stage storage unit, wherein the plurality of memory banks are placed in the second stage storage unit;

wherein the plurality of pieces of client data are simultaneously stored in the plurality of memory banks in bursts;

wherein a number of the plurality of memory banks is greater than a number of the plurality of clients, wherein the third stage unit performs double buffering by using a plurality of base addresses when storing each of the plurality of pieces of client data, and wherein each of the plurality of pieces of client data stored in the second stage storage unit is transferred to the third stage storage unit during a time interval between adjacent bursts.

* * * * *